Patented Dec. 29, 1931

1,838,908

UNITED STATES PATENT OFFICE

CARLETON ELLIS, OF MONTCLAIR, NEW JERSEY

WAX-CONDITIONED FINISH REMOVER

No Drawing. Application filed January 6, 1926. Serial No. 79,675.

The present invention relates to finish removers, that is to say substances capable of removing or loosening dried coats of paint or varnish or other finish of similar character, and has for its special object to produce removers which will be free from objections of certain removers heretofore described, and a particular object is to produce a paint and varnish remover containing paraffin wax, either alone or with other waxes, which shall possess a diminished tendency of such wax to crystallize, particularly during long periods of storage, and especially at relatively low temperatures. A further object is to produce a paint remover which shall be highly efficient in its action, and will be capable of use on various kinds of coatings to be removed.

Paraffin wax of the ordinary grade forms an excellent film-forming agent for removers of the character stated, this being cheap and effective, but it is open to certain objections. It is found that removers containing paraffin are liable to aggravated crystallization, particularly if kept for a long period in a cold place, as by being kept for several months in the winter time in an unheated building, and although it is readily possible to put this wax back into the uncrystallized or substantially colloidal condition by warming the same up and shaking well, many of the workmen in the art would not know this, and would accordingly pronounce the material to be deteriorated, which of course might give the particular brand a bad reputation among the workmen. A special object of the present invention is to reduce or retard this crystallization and separation, during ordinary storage of the material, and I have found that this can be to a substantial extent accomplished by the employment of materials containing the proper amount of a lower alkyl ester of the fatty acids, ethyl acetate (boiling point 77° C.) being mentioned as a specific example. Other esters of similar nature such as methyl propionate and the like also can be used, or mixtures containing these. It will be obvious that ethyl acetate produced from ordinary (methylated) denatured alcohol containing ethyl alcohol and methyl alcohol, will actually consist of a mixture of methyl acetate and ethyl acetate, the latter of course preponderating, and this material can be used to advantage in place of the pure ethyl acetate, for the purpose stated. The amount of the ester constituent is preferably between about 10% and about 20% of the entire remover.

Removers of the character specified generally consist of a wax solvent, a wax precipitant and a wax, either with or without other materials. As the main wax solvent I preferably employ benzol, either the relatively pure article or a benzol containing small amounts of higher aromatic hydrocarbons, such as toluol, xylol and the like, "90% benzol" can be used.

Benzol, in addition to its wax-dissolving function, acts, in removers of this class, as a penetrant or penetrating solvent which thus co-operates with the "active solvents" (including loosening solvents, such as the alcohols, acetone, etc.) employed in the remover. Toluol or xylol can also be used, replacing part or all of the benzol, although they are not generally so good as the benzol.

The crystallization of paraffin wax and to some extent also, other waxes including vegetable waxes and especially mineral waxes, is liable to occur when the known kinds of remover are stored in cold places. Such crystallization and the consequent separation of the waxy material reduces the viscosity of the remaining liquid part of the remover, so that the latter if used in this state would (to an excessive degree) drip or run off from vertical surfaces and it would evaporate unduly, having no protective film of the wax. The wax, in gelatinous form, in the remover, hence is of importance in holding the remover on the paint surface long enough for the proper loosening of the paint (or other finish) film.

While of course, the presence of waxes does not entirely prevent dripping and running of the remover from vertical or inclined surfaces, it decreases the tendency for this to occur. The wax in the "colloidal" or gelatinous condition in the present case tends to reduce the flowing and dripping, to a considerable extent.

The effect of keeping the wax in the gelatinous state (noncrystalline) can be enhanced by the addition to the removers hereinabove described of a small amount of nitrocellulose (say 0.1 to about 0.5%) which can be added as scrap celluloid. Too much of this material is objectionable as it increases the viscosity unduly, thereby preventing or reducing the penetration of the remover. About 0.2% to 0.25% may be used to advantage.

I prefer that all or practically all of the solvents present in the remover should have boiling points below 150° C., and preferably not substantially above 100° C., or even somewhat below this figure. (Obviously this does not refer to the wax or other thickeners). Without restricting myself to the use solely of solvent materials of this order of volatility, I prefer that by far the major portion of the liquid solvents used (say at least 75% thereof) should boil below 150° C., and preferably at not substantially above 100° C.

I preferably avoid the use, as stated, of difficultly volatile constituents, at least in large amounts. These difficultly volatile solvents might be absorbed in cracks or in porous or spongy portions of the wood, or other material being operated upon and might very slowly seep out therefrom, this continuing even after the new paint or other finish has been applied, thereby spotting the work to an undesired degree.

As the principal active solvent (loosening solvent) I preferably employ acetone which may be assisted by the alcohols, such as methyl alcohol, ethyl alcohol, denatured alcohol and the like, and also ethyl acetate, and the like, above mentioned. Other active solvents can be employed therewith, so far as miscible with the other constituents employed.

The alcohol if used as the main solvent, (and of course also the other constituents of the remover) may be employed in the anhydrous or substantially anhydrous state, (as compared with the commercial articles containing up to 10% or so of water). Thus I may use absolute alcohol or alcohol containing say not below 98.5% rather than alcohol of 85 to 95% strength. The activity of such substantially anhydrous alcohol (and of substantially anhydrous removers containing the same) is enough greater than that of alcohol containing 5 or 10% or more of water, so that the added expense of using the absolute alcohol sometimes is sufficiently compensated for by the added activity of the removers. The alcohols used herein are preferably ethyl, methyl or denatured.

Without restricting myself to the details thereof, I give the following examples of removers falling within the scope of the present invention (it being understood that all the ingredients in some cases may be employed in a substantially anhydrous state, i. e., without more than 0.5 to 1.5% of water).

*Example 1*

| | Parts |
|---|---|
| Benzol | 50 |
| Acetone | 30 |
| Ethyl acetate | 18 |
| Hard paraffin wax | 2 |

In making the remover, the paraffin wax is dissolved in the benzol. To this mixture is added the acetone and ethyl acetate. Other methods of mixing may be employed.

*Example 2*

| | Parts |
|---|---|
| Benzol | 35 |
| Alcohol (ethyl or denatured) | 30 |
| Acetone | 20 |
| Ethyl acetate | 14 |
| Hard paraffin wax | 1 |

Preferably I add about ¼% of soluble cotton to each of the above compositions.

Example 2 is advantageous for removing paint from surfaces which are to be coated with pyroxylin lacquer enamels. The latter have poor adhesion at best and any trace of wax remaining on the surface is prejudicial to adhesion. By reduction of wax solvent the proportion of wax is reduced substantially and the composition may be used to advantage for the purpose aforesaid.

In another type of removers, phenols (e. g. carbolic acid) have been used, with or without alkalies. In such removers it has heretofore been proposed to employ anhydrous alcohols to largely prevent injury to the hands of the workmen. In the present case I describe removers in which phenols and alkalies are not employed, and in which the anhydrous character of the solvents is for quite a different purpose. I preferably do not employ any phenolic bodies in the remover of this case.

The present application is also in part a continuation of my copending application No. 682,068, filed December 21, 1923, now Patent 1,618,867, which contains matter disclosed in my application No. 458,051 filed April 8, 1921 (now Patent No. 1,499,101). Features of the present invention are also included herein, continued from my copending application 556,827, filed April 27, 1922, now Patent 1,606,619.

I claim:

1. A finish remover comprising a monocyclic hydrocarbon which is a good wax solvent, as its largest component, and wax, and containing an alkyl ester with a boiling point not substantially over 100° C., in amount between about 10 and about 20% of the whole remover, to substantially decrease the tendency of the wax to crystallize during ordinary storage of the remover, and other finish-loosening solvents, such composition being substantially free from corrosive phenolic bodies.

2. A finish remover comprising a monocylic hydrocarbon which is a good wax solvent, as its largest component, and wax, and containing ethyl acetate in amount between about 10% and about 20% of the whole remover, to substantially decrease the tendency of the wax to crystallize during ordinary storage of the remover, together with not over 0.5% of nitrocellulose to act as a gelatinizer for the wax, and containing acetone and alcohol in combined amount between about 25% and about 35% of the entire remover, as its essential loosening solvents, such composition being substantially free from corrosive phenolic bodies.

In testimony whereof I affix my signature.
CARLETON ELLIS.